Dec. 27, 1938.   J. W. ALLEN   2,142,067
DYNAMO-ELECTRIC MACHINE
Filed March 26, 1936   3 Sheets—Sheet 1

INVENTOR.
Joseph W. Allen
BY
Martin J. Finnegan
ATTORNEY.

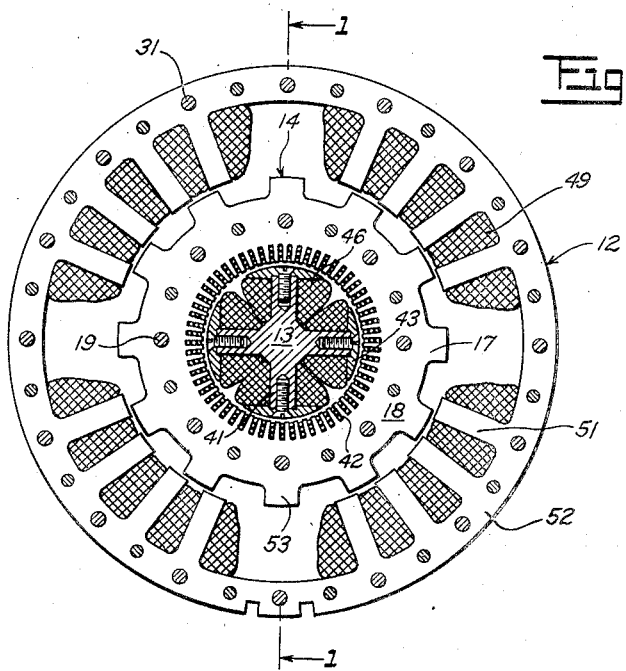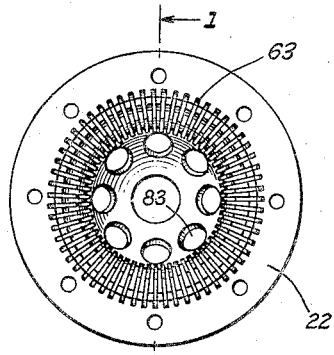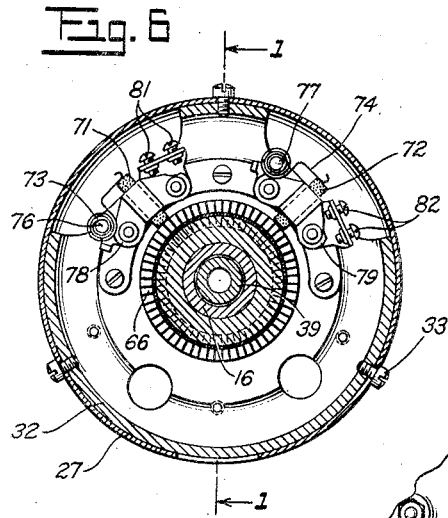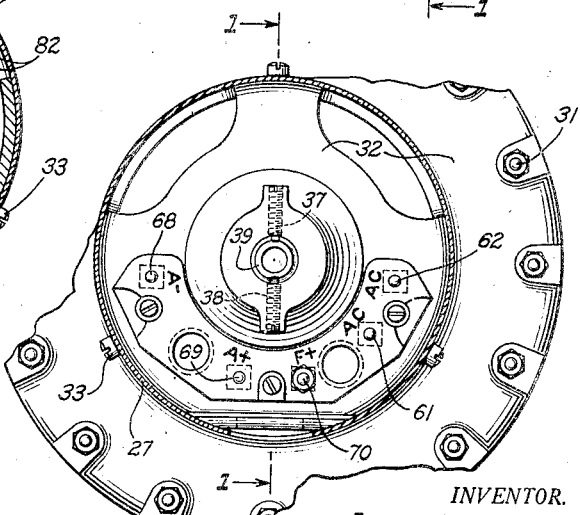

Dec. 27, 1938.          J. W. ALLEN                    2,142,067
                  DYNAMO-ELECTRIC MACHINE
                  Filed March 26, 1936          3 Sheets-Sheet 3
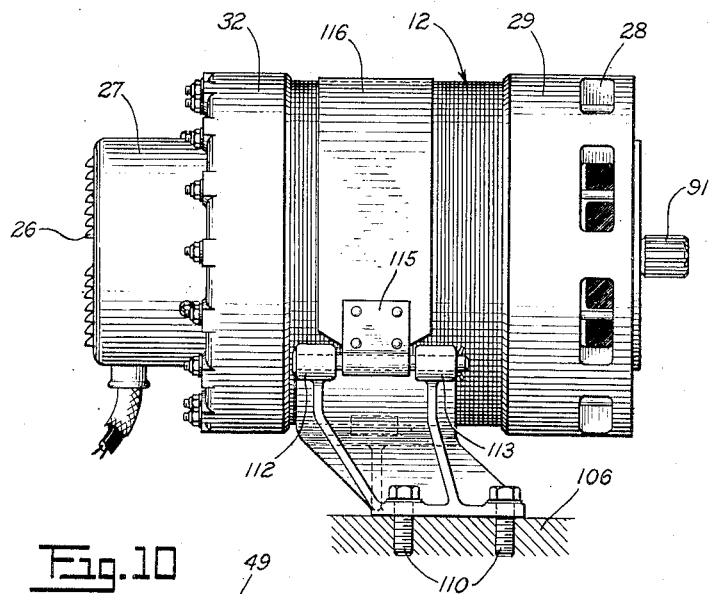
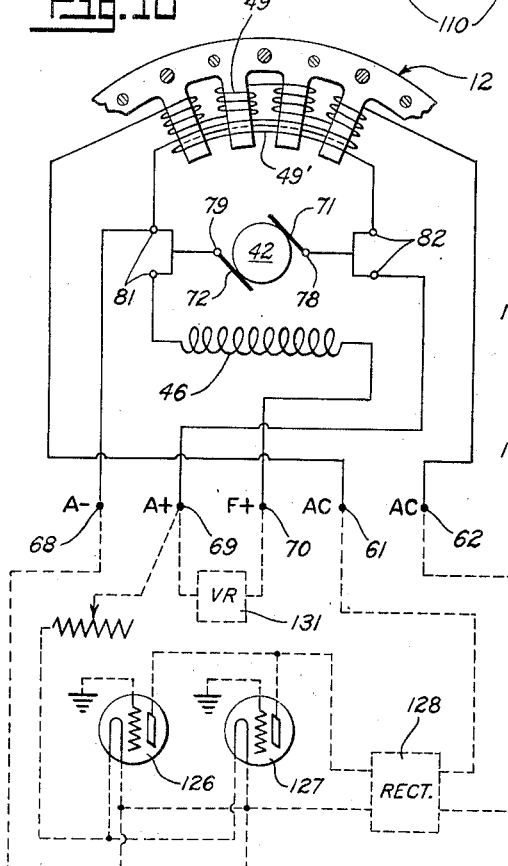
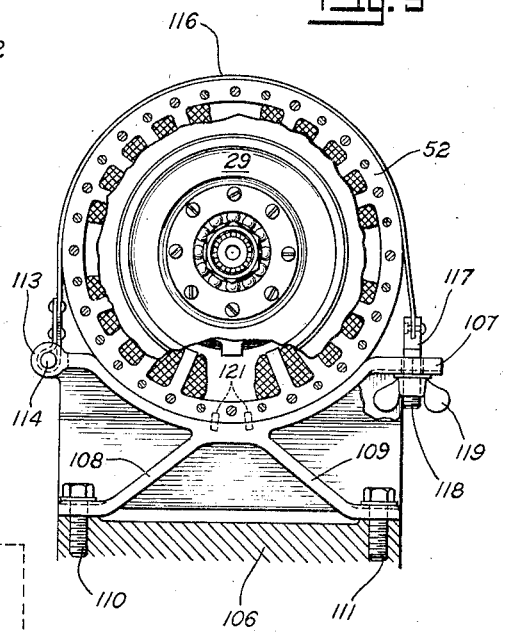
INVENTOR.
Joseph W. Allen
BY
Martin J. Finnegan
ATTORNEY.

Patented Dec. 27, 1938

2,142,067

UNITED STATES PATENT OFFICE 2,142,067

DYNAMO-ELECTRIC MACHINE

Joseph W. Allen, East Orange, N. J., assignor to Eclipse Aviation Corporation, East Orange, N. J., a corporation of New Jersey Application March 26, 1936, Serial No. 71,027

8 Claims. (Cl. 171—252)

This invention relates to dynamo electric machines, and particularly to dynamo electric machines of the multiple induction type.

An object of the invention is to provide a novel method of obtaining multiple current induction in a machine having only one rotor, which novel method may or may not (as preferred) be practiced upon an induction rotor, or armature, to which is applied a novel armature winding process including a novel method of connecting an internally wound armature with a commutator mounted externally of the armature shaft; the said winding and connecting processes likewise constituting parts of the present invention.
Other objects of the invention include the provision of a dynamo electric machine having the features of construction, and the combinations and relationships of parts indicated in the following description and illustrated in the accompanying drawings, but it is to be understood, however, that the drawings are for the purpose of illustration only, and are not designed as a definition of the limits of the invention, reference being had to the appended claims for this purpose.
In the drawings:—

Fig. 1 is a longitudinal sectional view of a dynamo electric machine embodying the principles of the present invention;

Figs. 2 to 7 inclusive are transverse views along the lines 2—2 to 7—7 inclusive, of Fig. 1;

Fig. 8 is an exterior view of the machine;

Fig. 9 is another exterior view of the machine, the viewpoint being at right angles to that of Fig. 1; and Fig. 10 is a diagram of electrical circuits including the windings of the illustrated machine.

Figure 1:
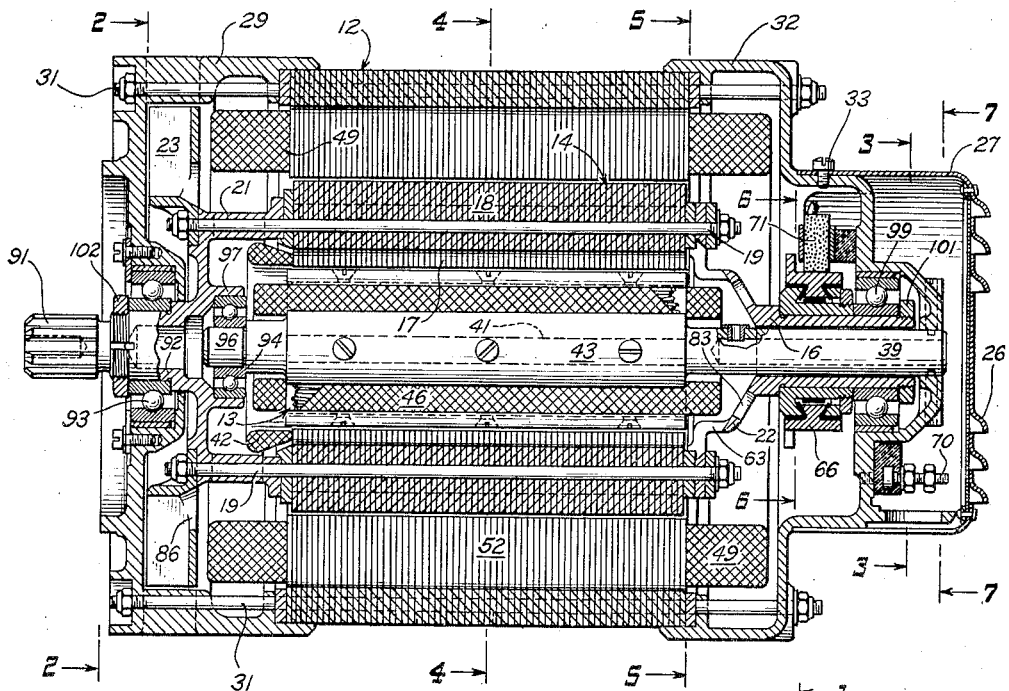
Figure 2:
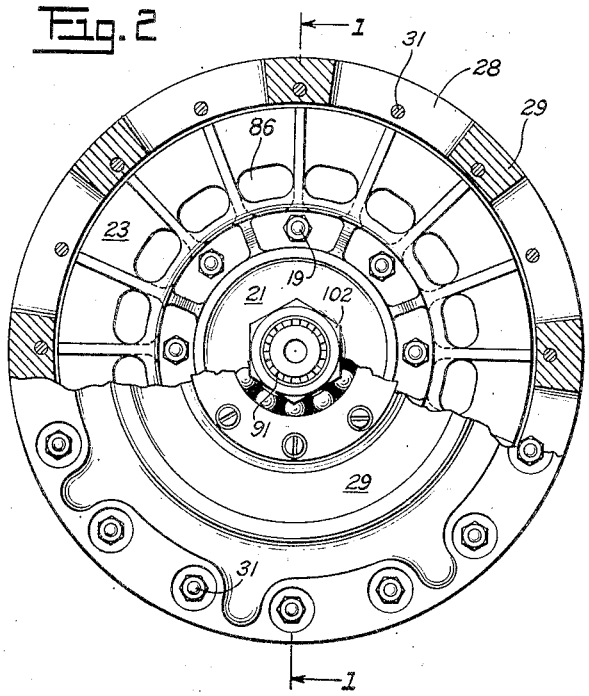
Figure 3:
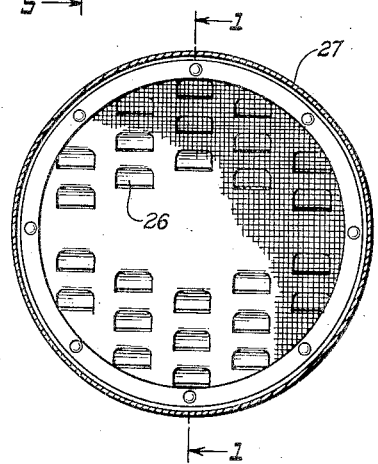

The drawings depict a machine having an outer stator 12, an inner stator 13, and a rotor 14 interposed between said stators, the rotor including a commutator carrying sleeve 16, an armature portion 17 consisting of laminae 18 held in assembled relation by bolts 19 which join the end plates 21, 22 of the rotor, and a vane type fan or blower 23 adapted to draw a cooling draft of air into the machine through louvres 26 in the end cup 27, and discharge the air currents through openings 28 in the inboard section 29 of the stator frame. Bolts 31 join the inboard section 29 with the outboard section 32 the latter having means 33 engageable therewith to removably secure the end cup 27 thereto. Integral with the framed element 32 or secured thereto by suitable screws or equivalent fastening devices such as those indicated at 37 and 38 in Fig. 7, is a hollow rod or shaft 39 passing inwardly through the sleeve 16 and passing further inwardly to constitue the stator 13 previouly referred to. As indicated in Fig. 4 this stator 13 has a plurality of radial extensions 41 constituting magnetic inductors or polar projections to cooperate electromagnetically with the windings 42 of the rotor 14, the projections having pole shoes 43 secured to the outer ends thereof to improve the magnetic circuit effective upon the said windings 42 of the rotor or armature 14. Preferably, these polar projections likewise have windings 46 constituting the field of the inner stator 13 while the outer stator 12 is also shown as having a winding 49 on the polar projections 51 of the individual laminae 52 which when assembled comprise the completed stator 12. These projections or teeth 51 cooperate electromagnetically with the radial projections or teeth 53 of the rotor 14 whereby the rotation of the latter generates an alternating current in the winding 49 of the stator 12, the ends of said winding being carried out to the terminals indicated at 61 and 62 in Fig. 7. The ends of the individual loops or coils of the winding 42 of the rotor or armature are passed through the radial slots 63 (Figs. 1 and 5) of the end plate 22, these ends being preferably in the form of flat strips conforming to the shape of the slots 63 and being secured at their ends to the individual insulated segments of the commutator 66 mounted in the usual manner on the sleeve 16 and thereby constituting a part of the rotor, and acting to deliver direct current to the terminals 68 and 69 (Fig. 7) through the instrumentality of brushes 71 and 72 (Fig. 6) and the springs 73, 74 which engage with the ends of said brushes and which are coiled about and fastened to pins 76 and 77 respectively of the brush terminals 78 and 79, the said terminals including terminal posts 81 and 82 respectively, for the reception of leads to connect said terminal posts with the outer terminal connections 68 and 69 and the D. C. excitation winding 49' of the stator 12 shown diagrammatically in Fig. 10, but omitted in Fig. 4 (to avoid obscuring the showing of the associated parts). Adjacent the slots 63 of the end plate 22 are a plurality of openings 83 through which the cooling air current entering the louvres 26 may pass along the stator 13 and thus prevent over-heating thereof, the points of exit of such cooling current being provided in the form of openings 86 (Fig. 2) between the sucsive vanes or blades of the fan 23 previously referred to.

The drive to the rotor 14 is by way of the splined extension 91 of the rotor end plate 21, there being an intermediate portion 92 to receive a suitable ball bearing assembly 93, and a second ball bearing assembly 94 is preferably provided on the reduced end 96 of the stator 13 to rotatably support the end plate 21 of the rotor by engagement of the inwardly extending hub 97 of the latter. At its opposite or commutator end the rotor receives a third ball bearing assembly 99 retained in place by suitable means 101 engaging the end of the shaft 16, there being similar retaining means 102 for the ball bearing assembly 93, while the ball bearing assembly 94 is retained by engagement with shoulders on the elements 21 and 13 respectively.

The means for securing the machine to the supporting floor 106 is shown in Figs. 8 and 9 as including a supporting base or saddle 107 having feet 108 and 109 anchored to the floor as indicated at 110 and 111, and also having pin supports 112 and 113 integral therewith, and adapted to receive a pin 114 which passes through a plate 115 constituting a hinge riveted to one end of a strap 116, adapted to pass around the laminated stator 12 to connect at its opposite end with a fastening member 117 having a threaded portion 118 adapted to pass through the saddle 107 and receive a wing nut 119 serving as a means of adjustably securing the strap in place. Prior to securing the strap the stator is properly located on the saddle with the aid of locating keys 121 fitting into registering grooves in the stator laminae and saddle as indicated in Fig. 9. The attaching means above described have the advantage of permitting the ready removal of the unit from this support and equally ready for reinstallation.

Fig. 10 indicates the wiring diagram involved when the machine is employed to deliver high frequency alternating current as well as relatively low voltage direct current for use in energizing the elements of radio tubes indicated diagrammatically at 126 and 127. As shown, the plate circuits of said tubes are connected with the alternating current outlets 61 and 62 through a rectifier 128 while the grid-filament circuits are connected directly to the low voltage direct terminals 68 and 69 leading from the brushes 71 and 72, by way of an intermediate binding post 81, 82, which post also served for the attachment of the ends of the exciting winding 49' of the stator 12, the main stator winding being indicated at 49 with its ends brought out to the delivery terminals 61 and 62. The field circuit of the direct current rotor or armature, constituted by the winding 46 on the stator poles, is shown as including a voltage regulator 131 inserted between the field terminal 70 and the armature terminal 69, so that the voltage regulator 131 and the field winding 46 are in shunt relationship to the armature winding 42.

It follows from the foregoing that I have provided in a self-contained compact unit, the means of generating both high frequency alternating current, capable of rectification, for use in energizing radio equipment, and also low voltage direct current for the direct current purposes of the same radio equipment, while at the same time providing the necessary exciting current for both the direct and alternating current windings of the machine.

What is claimed is:

1. In a dynamo electric machine, the combination with a slotted rotor, of a commutator and a plurality of conductors connecting with said commutator and extending into the slotted portions of said rotor, a stator extending through said rotor and having polar projections cooperating magnetically with said conductors, and a second stator surrounding said rotor, said second stator also having polar projections extending toward said rotor, a conductor coiled about said last-named polar projections and leading to an alternating current load, and corresponding polar projections on said rotor to cooperate magnetically with the polar projections on the outer stator, and, by virtue of said co-operation, to cause an alternating current to flow through said last-named conductor to energize said alternating current load, said last-named polar projections being disposed entirely beyond the radius of said commutator-connected conductors.

2. In a dynamo electric machine, the combination with a slotted rotor, of a commutator and a plurality of conductors connecting with said commutator and extending into the slotted portions of said rotor, a stator extending through said rotor and having polar projections cooperating magnetically with said conductors, and a second stator surrounding said rotor, said second stator also having polar projections extending toward said rotor, and corresponding polar projections on said rotor to cooperate magnetically with the polar projections on the outer stator, said last-named polar projections being disposed entirely beyond the radius of said commutator-connected conductors.

3. In a dynamo electric machine, the combination with a slotted rotor, of a commutator and a plurality of conductors connecting with said commutator and extending into the slotted portions of said rotor, a stator extending through said rotor and having polar projections cooperating magnetically with said conductors, and a second stator surrounding said rotor, said second stator also having polar projections extending toward said rotor, and corresponding polar projections on said rotor to cooperate magnetically with the polar projections on the outer stator and means connecting with said commutator for carrying current from said commutator to the windings surrounding the polar projections on both said stators, said outer stator having a second winding in which an alternating current is generated upon rotation of said rotor and means for directing a current of cooling air into said rotor and along the surfaces of said inner stator, said last named means including an apertured section of said rotor intermediate said slotted portion and said commutator, and a series of deflecting blades at the opposite end of said rotor to facilitate ejection of the air current through openings in the supporting frame of the machine.

4. In a dynamo electric machine, the combination with a slotted rotor, of a commutator and a plurality of conductors connecting with said commutator and extending into the slotted portions of said rotor, a stator extending through said rotor and having polar projections cooperating magnetically with said conductors, and a second stator surrounding said rotor, said second stator also having polar projections extending toward said rotor, and corresponding polar projections on said rotor to cooperate magnetically with the polar projections on the outer stator and means connecting with said commutator for carrying current from said commutator to the windings surrounding the polar projections on both said stators, said outer stator having a second winding in which an alternating current is generated upon rotation of said rotor and means for directing a current of cooling air into said rotor and along the surfaces of said inner stator, said last named means including an apertured section of said rotor intermediate said slotted portion and said commutator, and a series of deflecting blades at the opposite end of said rotor to facilitate ejection of the air current through openings in the supporting frame of the machine, a supporting base for the machine and resilient strap surrounding said outer stator to secure said frame to the supporting base.

5. In a dynamo electric machine, the combination with a slotted rotor, of a plurality of conductors disposed in the slots of said rotor, a stator surrounding said rotor, polar projections on said rotor to cooperate magnetically with said stator, said polar projections being disposed entirely beyond the radius of said slots and the conductors disposed therein, and additional polar projections for magnetic co-operation with said conductors, said last-named polar projections being disposed within said rotor.

6. A combination direct and alternating current generator comprising two stationary sets of concentrically disposed field magnets and a common rotor therebetween, said common rotor having conductor carrying parts projecting toward one set of said field magnets to co-operate therewith in the generation of direct current, and also having parts projecting toward the other set of field magnets to co-operate therewith in the genertion of alternating current, conducting means carried by said last-named set of field magnets for generation of current by induction, additional conducting means carried by said last-named set of field magnets, and means for feeding excitation current thereto.

7. In a dynamo electric machine, the combination with a slotted rotor, of a commutator and a plurality of conductors connecting with said commutator and extending into the slotted portions of said rotor, a stator surrounding said rotor, said stator having polar projections extending toward said rotor, to cooperate magnetically with the polar projections on the rotor, and said stator having a winding in which an alternating current is generated upon rotation of said rotor, and means for directing a current of cooling air into said rotor, said last named means including an apertured section of said rotor intermediate said slotted portion and said commutator, and a series of deflecting blades at the opposite end of said rotor to facilitate ejection of the air current through openings in the supporting frame of the machine.

8. In a dynamo electric machine, the combination with a slotted rotor, of a commutator and a plurality of conductors connecting with said commutator and extending into the slotted portions of said rotor, a stator surrounding said rotor, said stator having polar projections extending toward said rotor, to cooperate magnetically with the polar projections on the rotor, and said stator having a winding in which an alternating current is generated upon rotation of said rotor, and means for directing a current of cooling air into said rotor.

JOSEPH W. ALLEN.